(12) United States Patent
Choi

(10) Patent No.: US 11,367,922 B2
(45) Date of Patent: Jun. 21, 2022

(54) SECONDARY BATTERY PACK HAVING HOLDER

(71) Applicant: LG CHEM, LTD., Seoul (KR)

(72) Inventor: Sung-Ho Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 311 days.

(21) Appl. No.: 16/753,878

(22) PCT Filed: Dec. 12, 2018

(86) PCT No.: PCT/KR2018/015798
§ 371 (c)(1),
(2) Date: Apr. 6, 2020

(87) PCT Pub. No.: WO2020/004741
PCT Pub. Date: Jan. 2, 2020

(65) Prior Publication Data
US 2021/0104799 A1   Apr. 8, 2021

(30) Foreign Application Priority Data

Jun. 29, 2018  (KR) ........................ 10-2018-0075878

(51) Int. Cl.
*H01M 50/211* (2021.01)
*H01M 50/24* (2021.01)
(Continued)

(52) U.S. Cl.
CPC ....... *H01M 50/211* (2021.01); *H01M 10/425* (2013.01); *H01M 50/116* (2021.01);
(Continued)

(58) Field of Classification Search
None
See application file for complete search history.

(56) References Cited

U.S. PATENT DOCUMENTS 8,895,178 B2   11/2014  Byun et al.
2004/0180260 A1   9/2004  Somatomo et al.
(Continued)

FOREIGN PATENT DOCUMENTS

CN   101312237 A   11/2008
CN   103165845 A   6/2013
(Continued)

OTHER PUBLICATIONS

Extended European Search Report for European Application No. 18924007.0, dated Jan. 14, 2021.
(Continued)

*Primary Examiner* — Basia A Ridley
*Assistant Examiner* — Heng M. Chan
(74) *Attorney, Agent, or Firm* — Birch, Stewart, Kolasch & Birch, LLP

(57) ABSTRACT

Discussed is a secondary battery pack having effectively improved manufacturing efficiency and product durability. In this regard, the secondary battery pack includes: a battery cell; a protection circuit module mounted on a terrace structure where an electrode lead is formed; a holder including a body portion having a plate shape such that the battery cell is mounted on one surface, and a partition wall protruding from the body portion in an upward direction to surround at least a portion of a side portion of the battery cell in a horizontal direction; and an insulating molding member including an electrical insulating material, and including a protecting portion coated on and bonded to at least one region of a printed circuit board and a fixing portion protruding and extending from the protecting portion in a direction where the partition wall is located and fixed to one region of the partition wall.

14 Claims, 7 Drawing Sheets

(51) Int. Cl.
  *H01M 50/116* (2021.01)
  *H01M 50/572* (2021.01)
  *H01M 50/184* (2021.01)
  *H01M 10/42* (2006.01)

(52) U.S. Cl.
  CPC ......... *H01M 50/184* (2021.01); *H01M 50/24* (2021.01); *H01M 50/572* (2021.01)

(56) References Cited

U.S. PATENT DOCUMENTS

| | | |
|---|---|---|
| 2006/0035141 A1 | 2/2006 | Lee |
| 2006/0257731 A1 | 11/2006 | Yoon |
| 2008/0081254 A1 | 4/2008 | Kim et al. |
| 2010/0143793 A1 | 6/2010 | Yamamoto |
| 2012/0009443 A1 | 1/2012 | Baek et al. |
| 2012/0070702 A1 | 3/2012 | Byun et al. |
| 2013/0149561 A1 | 6/2013 | Hong et al. |
| 2013/0149563 A1 | 6/2013 | Lee et al. |
| 2013/0164570 A1 | 6/2013 | Bang et al. |
| 2013/0224523 A1 | 8/2013 | Nam et al. |
| 2013/0280558 A1 | 10/2013 | Hur et al. |
| 2014/0370356 A1 | 12/2014 | Yi |
| 2017/0149084 A1 | 5/2017 | Park et al. |

FOREIGN PATENT DOCUMENTS

| | | |
|---|---|---|
| JP | 2001-93497 A | 4/2001 |
| JP | 2005-183157 A | 7/2005 |
| JP | 2006-310304 A | 11/2006 |
| JP | 2006-331818 A | 12/2006 |
| JP | 2008-84814 A | 4/2008 |
| JP | 2013-175424 A | 9/2013 |
| KR | 10-2005-0121510 A | 12/2005 |
| KR | 10-2012-0047542 A | 5/2012 |
| KR | 10-1223732 B1 | 1/2013 |
| KR | 10-2013-0065287 A | 6/2013 |
| KR | 10-1270593 B1 | 6/2013 |
| KR | 10-2013-0135063 A | 12/2013 |
| KR | 10-1463816 B1 | 11/2014 |
| KR | 10-2014-0145787 A | 12/2014 |
| KR | 10-2015-0038914 A | 4/2015 |
| KR | 10-1539691 B1 | 7/2015 |
| KR | 10-1739300 B1 | 5/2017 |
| KR | 10-2017-0094646 A | 8/2017 |
| WO | WO 2016/152024 A1 | 9/2016 |

OTHER PUBLICATIONS

International Search Report (PCT/ISA/210) issued in PCT/KR2018/015798, dated Mar. 22, 2019.

SECONDARY BATTERY PACK HAVING HOLDER

TECHNICAL FIELD

The present disclosure relates to embodiments of a secondary battery pack including a holder, and more particularly, to a secondary battery pack having effectively improved manufacturing efficiency and product durability.

The present application claims priority to Korean Patent Application No. 10-2018-0075878 filed on Jun. 29, 2018 in the Republic of Korea, the disclosure of which is incorporated herein by reference in its entirety.

BACKGROUND ART

Recently, with the rapid increase in demands for portable electronic products, such as laptop computers, video cameras, portable phones, and the like, and the regularization of development of electric vehicles, energy storage batteries, robots, satellites, and the like high-performance secondary batteries capable of being repeatedly charged and discharged have been actively studied.

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material sealing and accommodating the electrode assembly with an electrolyte solution together.

Meanwhile, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material. Also, the can-type secondary battery may be again classified into a cylindrical battery and an angulated battery, according to a shape of the metal can.

Here, a pouch of the pouch-type secondary battery is largely distinguished into a lower sheet and an upper sheet covering the lower sheet, and an electrode assembly in which a positive electrode, a negative electrode, and a separator are stacked and rolled is accommodated in the pouch. Then, after the electrode assembly is accommodated, edges of the upper sheet and the lower sheet are sealed via thermal fusion or the like. Also, an electrode tab extracted from each electrode is combined to an electrode lead, and an insulating film may be added to a region of the electrode lead contacting a sealing portion.

As such, the pouch-type secondary battery has flexibility of being configured in various forms, and a secondary battery of the same capacity may be realized with smaller volume and mass. However, unlike the can-type, since the pouch-type secondary battery uses a soft pouch as a container, the pouch-type secondary battery may have weak mechanical strength, have a possibility of moisture penetration, and have a stability issue of being exploded due to a high temperature and high pressure inside a battery, which may be caused by an abnormal operating state of the battery, such as an internal short, an overcharged state exceeding an allowed current and voltage, exposure to a high temperature, and an impact caused by a fall.

Also, since various types of combustible materials are embedded in such a pouch-type secondary battery, there is a risk of heat generation, explosion, or the like caused by overcharging, overcurrent, and other physical external impact, and thus the pouch-type secondary battery has a serious disadvantage in terms of safety. Accordingly, a protection circuit module (PCM) capable of effectively controlling an abnormal state, such as overcharging or the like, is mounted on a secondary battery pack while being electrically connected to a battery cell.

Also, the PCM includes a PCM case configured to surround a printed circuit board (PCB) to protect the provided PCB.

However, such a PCM case may easily cause damage to a connection structure between an electrode lead and the PCB or damage to an element, chip, or the like mounted on the PCB while the PCB connected to the electrode lead is accommodated in and combined to the PCM case during processes of manufacturing the PCM of the related art. As such, since the manufacturing processes are very complicated, a skilled person is absolutely required, and resulting in a high product defect rate.

Moreover, since the PCB or secondary battery embedded in the PCM case often moves due to an external impact during the use of the secondary battery pack of the related art, the life of the secondary battery pack is reduced due to damage to an internal component.

DISCLOSURE

Technical Problem

The embodiments of the present disclosure are designed to solve the problems of the related art, and therefore the embodiments of the present disclosure are directed to providing a secondary battery pack having effectively improved manufacturing efficiency and product durability.

These and other objects and advantages of the embodiments of present disclosure may be understood from the following detailed description and will become more fully apparent from the example embodiments of the present disclosure. Also, it will be easily understood that the objects and advantages of the present disclosure may be realized by the means shown in the appended claims and combinations thereof.

Technical Solution

In one aspect of the present disclosure, there is provided a secondary battery pack including: a battery cell including an electrode assembly, a pouch exterior material that includes an accommodating portion in which the electrode assembly and an electrolyte solution are accommodated and a sealing portion formed by sealing a circumferential surface of the accommodating portion, and an electrode lead protruding and extending from the sealing portion; a protection circuit module including a printed circuit board where a protection circuit is formed, wherein the printed circuit board is mounted on a terrace structure of the sealing portion where the electrode lead is formed; a holder including a body portion having a plate shape such that the battery cell is mounted on one surface thereof, and a partition wall protruding from the body portion in an upward direction to surround at least a portion of a side portion of the battery cell in a horizontal direction; and an insulating molding member including an electrical insulating material and including a protecting portion coated on and bonded to at least one region of the printed circuit board, and a fixing portion protruding from the protecting portion in a direction where the partition wall is located and fixed to one region of the partition wall.

Also, in the fixing portion of the insulating molding member, an end portion protruding from the protecting portion in the direction where the partition wall is located may have a hook structure bent in a downward direction along the partition wall.

Moreover, the partition wall of the holder may include an insertion hole penetrated in the horizontal direction, and one region of the fixing portion of the insulating molding member may be inserted in and fixed to the insertion hole.

In addition, the partition wall may extend along a circumference of the body portion, and a curved portion curved in an arc shape on a plane is formed in one region of the partition wall.

Also, the holder may include a molding barrier wall spaced apart from the partition wall by a certain distance in an outward direction and protruding and extending in an upward direction.

Further, the insulating molding member may entirely cover the printed circuit board without any externally exposed region of the printed circuit board.

In addition, a lower surface of the insulating molding member may be configured to be located on a same plane as a lower surface of the accommodating portion of the battery cell.

Moreover, a depressed groove recessed in a horizontal inward direction may be provided on an outer surface of the protecting portion of the insulating molding member. In this case, the depressed groove may be configured to accommodate one region of the electrode lead.

Also, a heat radiating portion opened in an up-and-down direction and discharging heat generated in the battery cell may be provided at the body portion of the holder.

In another aspect of the present disclosure, there is also provided a power supply apparatus including the secondary battery pack.

In another aspect of the present disclosure, there is also provided an electronic device including the power supply apparatus.

Advantageous Effects

According to an aspect of the present disclosure, by including an insulating molding member, a secondary battery pack may stably protect an element and component mounted on a printed circuit board of a protection circuit module. Accordingly, in the present disclosure, damage to or detachment of the element and component of the printed circuit board caused by an external impact may be effectively prevented.

Also, according to an aspect of the present disclosure, an insulating molding member includes a protecting portion configured to at least partially cover a printed circuit board, and thus the printed circuit board may be effectively prevented from being short-circuited with a metal thin film provided at a pouch exterior material.

Moreover, according to an aspect of the present disclosure, an insulating molding member includes a fixing portion protruding from a protecting portion in a direction where a partition wall is located and fixed to one region of the partition wall, and thus movement of a battery cell mounted on a holder in a horizontal direction may be effectively prevented and an impact phenomenon between the partition wall and the battery cell or a protection circuit module caused by frequent movement may be effectively prevented, thereby reducing damage generated during the use of a product.

Also, according to an aspect of the present disclosure, since a fixing portion of a hook structure of an insulating molding member may prevent a battery cell from moving in a front-and-back direction, damage to a structure of the battery cell and to a connection structure of a printed circuit board connected to an electrode lead may be prevented.

In addition, according to another aspect of the present disclosure, by forming a part of a fixing portion of an insulating molding member to be inserted and fixed to an insertion hole formed at a partition wall, a higher bonding force with the partition wall may be exerted compared to a fixing portion of a hook structure of the insulating molding member, and thus durability of a secondary battery pack may be further increased.

Moreover, according to another aspect of the present disclosure, by additionally forming a molding barrier wall at a holder, hot melt resin injected to form an insulating molding member may be prevented from flowing outside the holder.

Also, according to the present disclosure, a molding barrier wall may function as a guide such that a fixing portion of an insulating molding member is stably extended downward along a partition wall, and thus a defect rate of a product may be remarkably reduced.

DESCRIPTION OF DRAWINGS

The accompanying drawings illustrate example embodiments of the present disclosure and together with the foregoing disclosure, serve to provide further understanding of the technical features of the present disclosure, and thus, the present disclosure is not construed as being limited to the drawing.

MODE FOR DISCLOSURE

Hereinafter, example embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
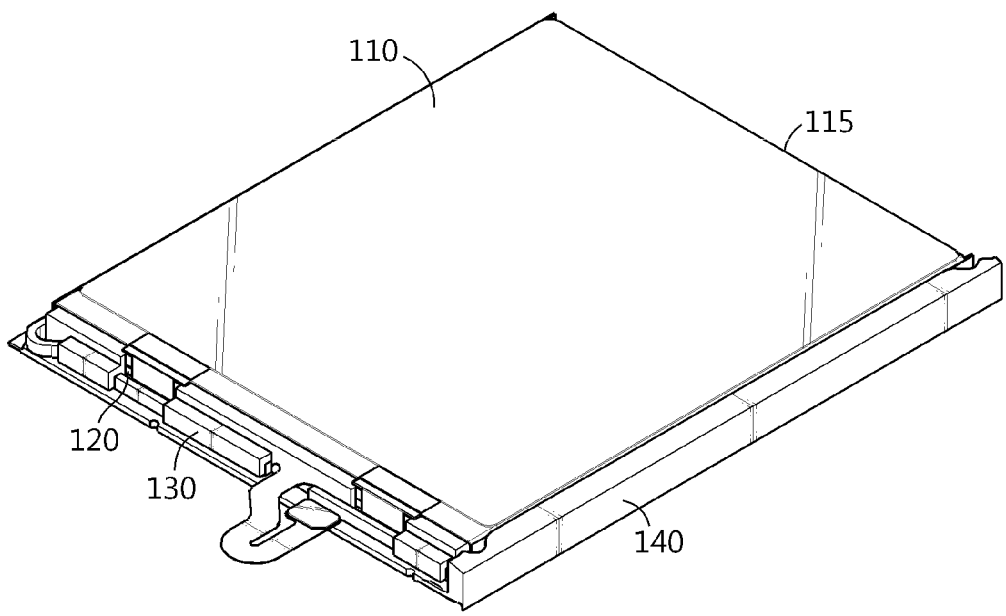
FIG. 1 is a perspective view schematically showing components of a secondary battery pack, according to an embodiment of the present disclosure.
Figure 2:
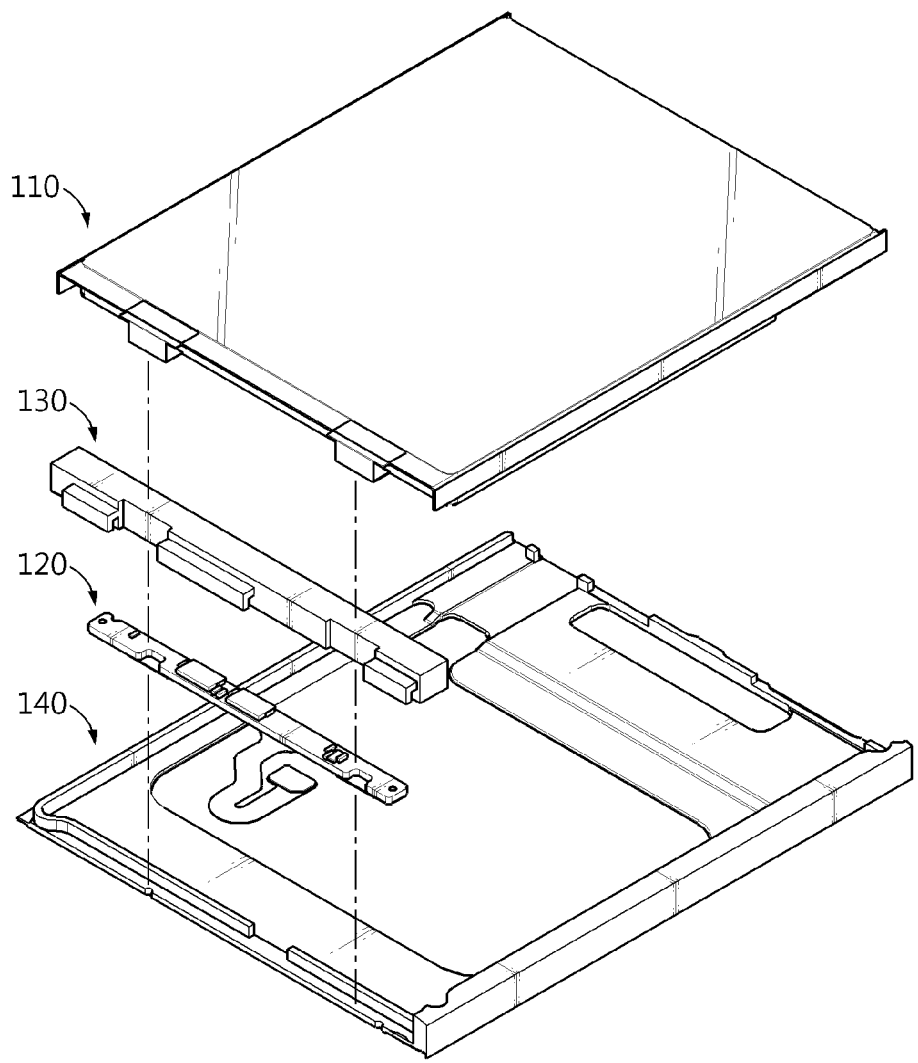
FIG. 2 is an exploded perspective view schematically showing the separated components of the secondary battery pack of FIG. 1.
Figure 3:
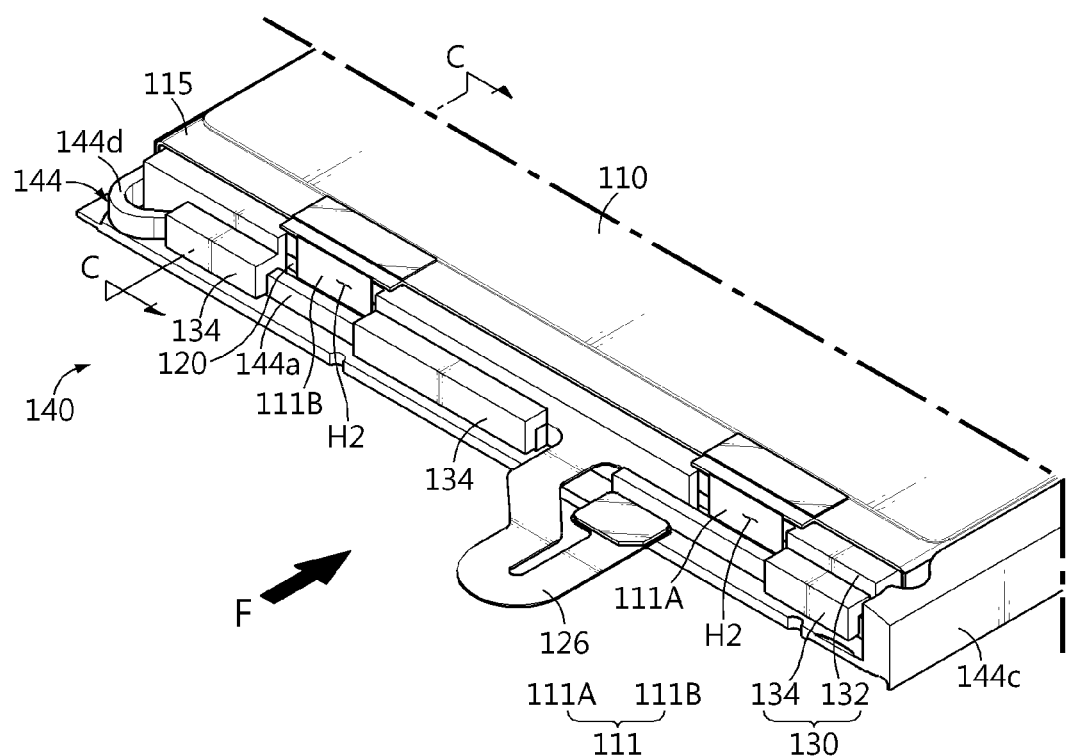
FIG. 3 is a partial perspective view schematically showing some components of a secondary battery pack, according to an embodiment of the present disclosure.
Figure 4:
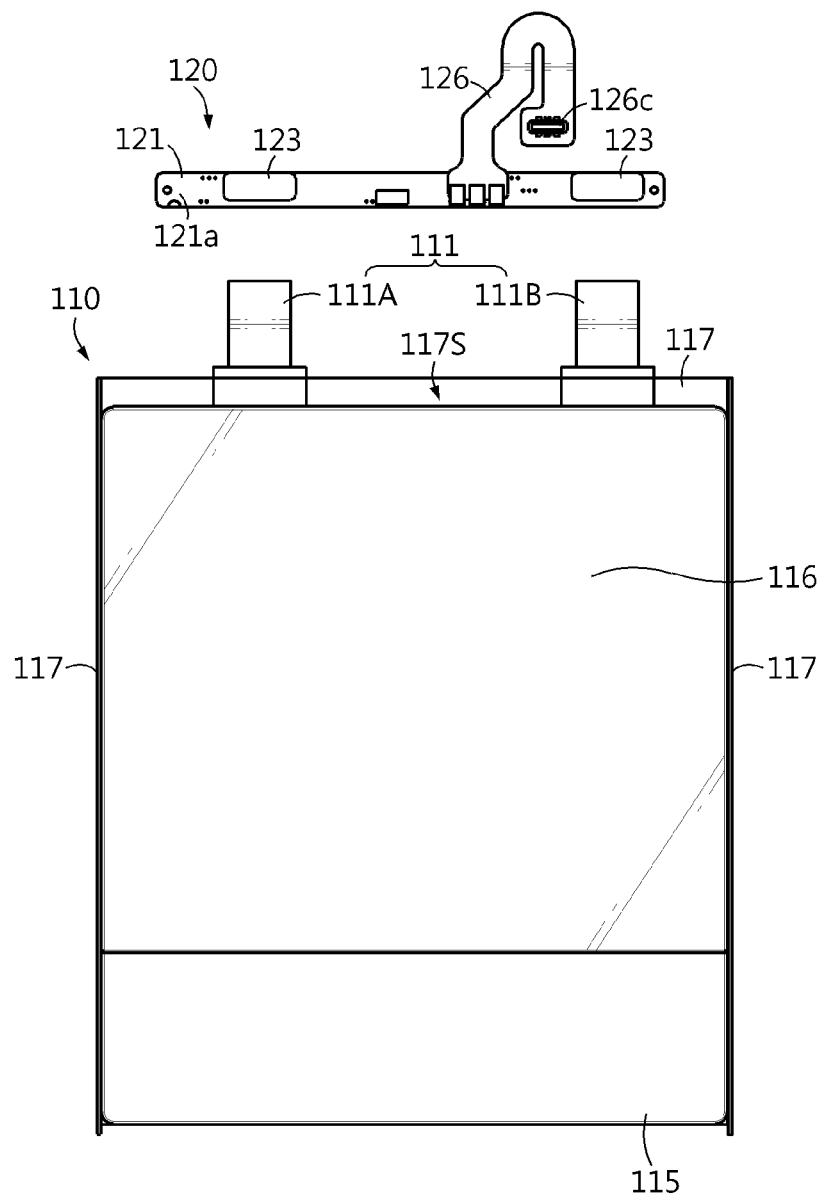
FIG. 4 is an isolated bottom view schematically showing some components of a secondary battery pack, according to an embodiment of the present disclosure.

FIG. 1 is a perspective view schematically showing components of a secondary battery pack, according to an embodiment of the present disclosure. FIG. 2 is an exploded perspective view schematically showing the separated components of the secondary battery pack of FIG. 1. FIG. 3 is a partial perspective view schematically showing some components of a secondary battery pack, according to an embodiment of the present disclosure. Also, FIG. 4 is an isolated bottom view schematically showing some components of a secondary battery pack, according to an embodiment of the present disclosure. Here, FIG. 4 schematically illustrates a battery cell 110 and a protection circuit module 120 being viewed upward from the bottom while the battery cell 110 and the protection circuit module 120 are isolated from each other.

Referring to FIGS. 1 through 4, a secondary battery pack 110 includes the battery cell 110 and the protection circuit module 120.

Here, the battery cell 110 may be a pouch-type battery cell 110. In particular, the pouch-type battery cell 110 may include an electrode assembly, an electrolyte solution, and a pouch exterior material 115. Also, the electrode assembly may be sealed inside the pouch exterior material 115 together with the electrolyte solution, and an electrode lead 111 may be provided at one side of the pouch exterior material 115.

Also, the electrode assembly may be configured in a form in which at least one positive electrode plate and at least one negative electrode plate are arranged with the separation film therebetween. In detail, the electrode assembly may be a rolled type in which one positive electrode plate and one negative electrode plate are rolled together with the separator, or a stacked type in which a plurality of positive electrode plates and a plurality of negative electrode plates are alternately stacked with a separator therebetween.

The pouch exterior material 115 may include an external insulating layer, a metal layer, and an internal adhesive layer. Such a pouch exterior material 115 may include a metal thin film, such as an aluminum thin film, so as to protect internal components, such as the electrode assembly, the electrolyte solution, etc., and improve heat dissipation and complementation with respect to electrochemical properties of the electrode assembly and the electrolyte solution.

Such an aluminum thin film may be disposed between insulating layers formed of an insulating material so as to secure electric insulation between components inside the battery cell 110, such as the electrode assembly and the electrolyte solution, and other components outside the battery cell 110.

Also, the pouch exterior material 115 may be configured of two pouches and at least one of the two pouches may have an internal space having a concave shape. Also, the pouch exterior material 115 may include an accommodating portion 116 in which the electrode assembly and the electrolyte solution are accommodated.

In addition, in the pouch exterior material 115, circumferential portions of two pouches may be welded together such that the internal space of the accommodating portion 116 where the electrode assembly is accommodated is sealed, thereby sealing a circumferential surface of the accommodating portion 116 to form a sealing portion 117.

For example, as shown in FIG. 4, in the pouch exterior material 115, the sealing portion 117 bent in a downward direction may be formed at left and right portions of the accommodating portion 116.

Also, the battery cell 110 may include a terrace structure 117S where the electrode lead 111 is located and a circumferential surface of the pouch exterior material 115 is sealed. Here, unlike the sealing portion 117 bent and formed at the left and right portions, the terrace structure 117S need not bend in an up-and-down direction and may extend in a horizontal direction.

In addition, when viewed from a direction indicated by an arrow F, the pouch-type battery cell 110 may include the electrode lead 111 protruding forward from the sealing portion 117. The electrode lead 111 may include a positive electrode lead 111A and a negative electrode lead 111B. Here, each of the positive and negative electrode leads 111A and 111B is configured in a plate shape such that two wide surfaces are respectively located at top and bottom portions.

For example, as shown in FIG. 4, the positive electrode lead 111A may protrude at one side of one edge of the terrace structure 117S of the battery cell 110. Also, the negative electrode lead 111B may be spaced apart from the positive electrode lead 111A in a horizontal direction and protrude at the other side of the one edge of the terrace structure 117S.

Since the configuration of the pouch-type secondary battery 110 described above is obvious to one of ordinary skill in the art, details thereof will not be provided here. Also, the secondary battery pack 100 according to the present disclosure may employ various battery cells 110 well-known at the time of application of the present disclosure.

The protection circuit module 120 may include a printed circuit board 121 where a protection circuit is formed.

The printed circuit board 121 may have top and bottom surfaces relatively wider than side surfaces. Also, the printed circuit board 121 may be mounted on the terrace structure 117S where the electrode lead 111 is formed, among regions where the sealing portion 117 is formed. At this time, the printed circuit board 121 may be positioned that the top and bottom surfaces relatively wider than the side surfaces face the top surface of the terrace structure 117S.

The protection circuit module 120 may include a lead connecting plate 123 formed on one surface 121a of the printed circuit board 121 such that the printed circuit board 121 is electrically connected to the electrode lead 111 of the battery cell 110.

The lead connecting plate 123 may have a single flat plate shape. In addition, the lead connecting plate 123 may be mounted to have a parallel plane with the surface 121a of the printed circuit board 121. Moreover, the lead connecting plate 123 may have one surface bonded to a connection terminal provided at the printed circuit board 121 and the other surface bonded to the electrode lead 111 of the battery cell 110.

For example, as shown in FIG. 4, the protection circuit module 120 may include two lead connecting plates 123 combined and connected to the positive and negative electrode leads 111A and 111B, and the lead connecting plate 123 may be mounted to have the parallel plane with the surface 121a of the printed circuit board 121.

A plurality of elements or components may be mounted on the printed circuit board 121. Here, the element and component may be generally included and used in a secondary battery pack. Here, safe elements and chips may be mounted on the printed circuit board 121.

The protection circuit module 120 may include another printed circuit board 126 connected and combined to the printed circuit board 121.

The printed circuit board 121 may include an external input and output terminal. Also, one end portion of the printed circuit board 126 may be connected and combined to the external input and output terminal of the printed circuit board 121. Also, in the other end portion of the printed circuit board 126, a connector 126c may be provided at one end portion to be connected to another external device. The printed circuit board 126 may be, for example, a flexible printed circuit board (FPCB) including a flexible board.

Figure 5:
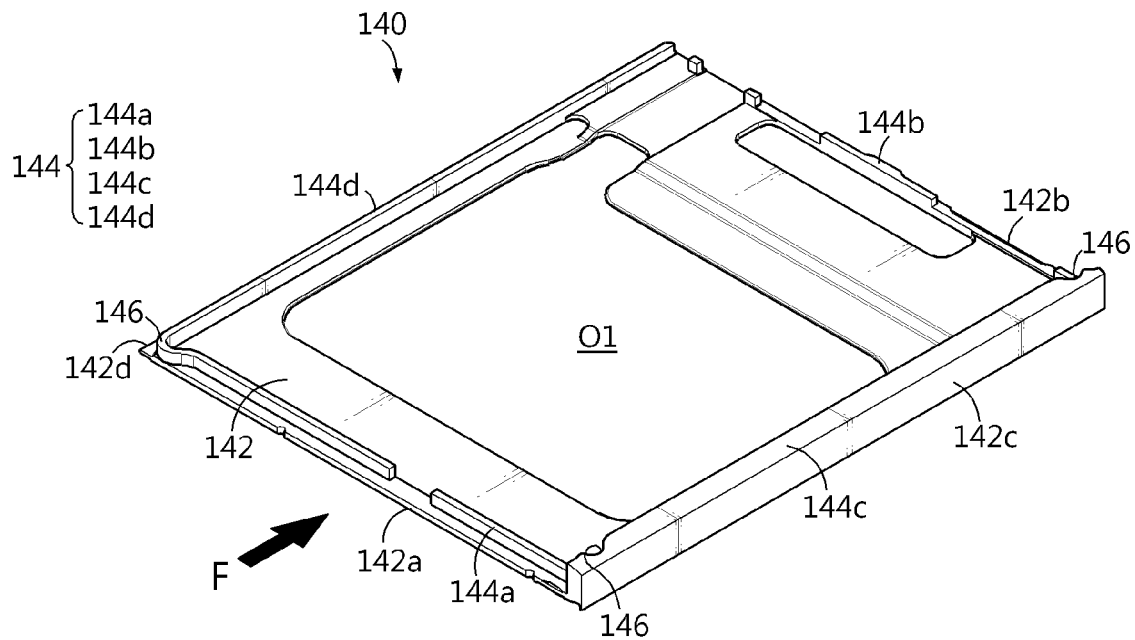
FIG. 5 is a perspective view schematically showing a holder of a secondary battery pack, according to an embodiment of the present disclosure.

FIG. 5 is a perspective view schematically showing a holder of a secondary battery pack, according to an embodiment of the present disclosure.

Referring to FIG. 5 together with FIG. 4, the secondary battery pack 100 of the present disclosure may include a holder 140 configured to mount the battery cell 110.

Here, the holder 140 may include a body portion 142 and a partition wall 144. In detail, the body portion 142 may have a plate shape such that the battery cell 110 is mounted on one surface (top surface) thereof. The plate shape denotes a shape in which top and bottom surfaces in an up-and-down direction is relatively wider than side surfaces in a horizontal direction.

In other words, for example, when viewed from the direction indicated by the arrow F, the body portion 142 of the holder 140 may have a quadrangular plate shape including a first edge 142a, a second edge 142b, a third edge 142c, and a fourth edge 142d respectively positioned at a front end, a rear end, a left end, and a right end.

Here, the terms indicating directions, such as front, back, left, right, up, and down, may vary according to a position of an observer or how a target is placed. However, in the present specification, for convenience of description, front, back, left, right, up, and down directions are distinguished based on the direction indicated by the arrow F.

A heat radiating portion O1 opened in an up-and-down direction and discharging heat generated in the battery cell 110 may be provided at the body portion 142 of the holder 140. In detail, the heat radiating portion O1 may be provided at a location corresponding to the accommodating portion 116 where heat generation of the battery cell 110 is concentrated. Moreover, one region of the accommodating portion 116 may be exposed outside the holder 140 through the heat radiating portion O1.

For example, as shown in FIGS. 1 and 5, the heat radiating portion O1 opened in the up-and-down direction may be provided at the body portion 142 of the holder 140 where the accommodating portion 116 of the battery cell 110 is located.

As such, according to such a configuration of the present disclosure, by providing the heat radiating portion O1 at the holder 140, heat of the battery cell 110 generated during the use of the secondary battery pack 100 may be effectively discharged, and thus the life of the secondary battery pack 100 may be largely increased.

In addition, the partition wall 144 may protrude from the body portion 142 in the up-and-down direction to surround at least a portion of a side portion of the battery cell 110 in a horizontal direction. In detail, the partition wall 144 may extend along a side portion of the battery cell 110 in the horizontal direction.

The partition wall 144 may be provided in contact with or adjacent to the first edge 142a, the second edge 142b, the third edge 142c, and the fourth edge 142d of the body portion 142. Also, protruding heights of the partition walls 144 provided at the first edge 142a, the second edge 142b, the third edge 142c, and the fourth edge 142d may be different from each other. Moreover, thicknesses of the partition walls 144 in the horizontal direction provided at the first edge 142a, the second edge 142b, the third edge 142c, and the fourth edge 142d may also be different from each other.

For example, as shown in FIG. 5, a partition wall 144c provided at the third edge 142c may have the highest protruding height in the up-and-down direction and the thickest thickness in the horizontal direction among partition walls 144a, 144b, and 144d provided at the remaining first edge 142a, second edge 142b, and fourth edge 142d.

At this time, the third edge 142c of the holder 140 may be located adjacent to an outer wall of an exterior case of an electronic device using the secondary battery pack 100 as a power source.

As such, according to such a configuration of an embodiment of the present disclosure, among the partition walls 144a through 144d provided at edges of the holder 140 of the present disclosure, by forming the protruding height and thickness of the partition wall 144c to be relatively greater than those of the remaining partition walls 144a, 144b, and 144d, damage to the battery cell 110 mounted on the holder 140 due to an external impact at an edge of the holder 140 may be effectively prevented.

The holder 140 may include an externally opened region, i.e., one region where the partition wall 144a is not provided at the first edge 142a of the body portion 142, such that the printed circuit board 126 protrudes externally in the horizontal direction. Accordingly, the printed circuit board 126 may contact and be connected to the printed circuit board 121 without being additionally bent or deformed, and thus manufacturing efficiency and space utility may be improved.

Meanwhile, referring back to FIGS. 1 and 2, the secondary battery pack 100 of the present disclosure may further include an insulating molding member 130 including an electrical insulating material.

Here, the electrical insulating material may be a polymer compound having low electric conductivity. For example, the insulating molding member 130 may be polymer resin, silicon, rubber, or the like.

In addition, the insulating molding member 130 may be configured in a form in which heat melting type polymer resin is hardened.

In detail, the heat melting type polymer resin may be hot-melt resin. The hot-melt resin is solvent-free resin, and may be thermoplastic resin that is solid at the room temperature but is melted at a melting point when heated and then is solidified via cooling, thereby providing adhesion. For example, the thermoplastic resin may be at least one of polystyrene, polyvinyl chloride, acrylic resin, polyethylene, polypropylene, and polyester.

Also, the insulating molding member 130 may be formed by a hot-melt injection molding apparatus. In detail, the hot-melt injection molding apparatus may include a resin supply unit, a temperature control unit, and an operating unit.

First, the resin supply unit may be configured to inject resin melted at a certain temperature. Also, the temperature control unit may include a heater or a cooler such that a temperature of a mold is uniformly maintained. In addition, the operating unit may include the mold and a control pad.

As such, according to such a configuration of the embodiment of the present disclosure, the insulating molding member 130 formed of the hot-melt resin does not include a solvent containing a harmful component, and thus safety of a manufacturer and a user may be increased when the insulating molding member 130 is configured.

Also, the insulating molding member 130 may be provided at a top surface and a bottom surface of the printed circuit board 121. In other words, the insulating molding member 130 may be formed by, after an element or component is mounted on the printed circuit board 121, coating melted high-temperature resin on a top surface, and cooling and hardening the coated resin.

As such, according to such a configuration of the embodiment of the present disclosure, the insulating molding member 130 may stably protect the element and component mounted on the printed circuit board 121. Accordingly, in the present disclosure, damage to or detachment of the element and component of the printed circuit board 121 caused by an external impact may be effectively prevented.

Also, the insulating molding member 130 may include a transparent material from one surface to the other surface of at least one region. In detail, the insulating molding member 130 may include a transparent material such that the element and component mounted on the printed circuit board 121 are identified with naked eyes. For example, the insulting molding member 130 may entirely include a transparent material such that an outer surface of the printed circuit board 121 is seen through.

Figure 6:
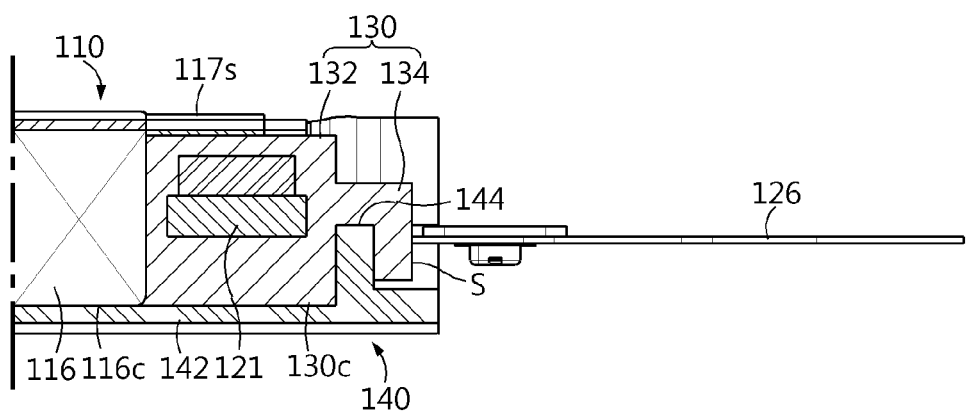
FIG. 6 is a schematic partial cross-sectional view of a secondary battery pack taken along a line C-C of FIG. 3.

FIG. 6 is a schematic partial cross-sectional view of a secondary battery pack taken along a line C-C of FIG. 3.

Referring to FIG. 6 together with FIGS. 1 and 3, the insulating molding member 130 may include a protecting portion 132 and a fixing portion 134.

In detail, the protecting portion 132 may be a region that is coated on and bonded to at least one region of the printed circuit board 121. In addition, the insulating molding member 130 may entirely cover the printed circuit board 121 such that there is no externally exposed region in the printed circuit board 121.

For example, as shown in FIG. 6, the protecting portion 132 may be provided to cover an entire outer surface of the printed circuit board 121.

As such, according to such a configuration of the embodiment of the present disclosure, the insulating molding member 130 includes the protecting portion 132 configured to cover at least a portion of the printed circuit board 121, and thus the printed circuit board 121 may be effectively prevented from being short-circuited with a metal thin film provided in the pouch exterior material 115.

In addition, the insulating molding member 130 may be bonded on the terrace structure 117S of the battery cell 110. In detail, the insulating molding member 130 may be manufactured by injecting and then hardening the hot-melt resin while the protection circuit module 120 is positioned on the terrace structure 117S of the battery cell 110.

The insulating molding member 130 may be bonded on the terrace structure 117S of the battery cell 110 such that the protection circuit module 120 is fixed on the terrace structure 117S of the battery cell 110.

As such, according to such a configuration of the embodiment of the present disclosure, since the insulating molding member 130 is bonded on the terrace structure 117S of the battery cell 110, the protection circuit module 120 may be stably fixed on the terrace structure 117S of the battery cell 110 and an adhesive member used in the related art may be omitted, thereby reducing manufacturing costs.

The fixing portion 134 may protrude from the protecting portion 132 in a direction where the partition wall 144 is located. Also, an end portion of the fixing portion 134 in a protruding direction may be fixed to one region of the partition wall 144.

For example, as shown in FIG. 3, the insulating molding member 130 may include three fixing portions 134. When viewed from the direction indicated by the arrow F, the three fixing portions 134 may protrude forward from a front portion of the protecting portion 132 to where the partition wall 144 is provided, and the protruding end portion of the fixing portion 134 may be combined and fixed to a top surface and a front surface of the partition wall 144 provided at the holder 140.

As such, according to such a configuration of the embodiment of the present disclosure, since the insulating molding member 130 protrudes from the protecting portion 132 in the direction where the partition wall 144 is located and includes the fixing portion 134 fixed to one region of the partition wall 144, movement of the battery cell 110 in the horizontal direction mounted on the holder 140 may be effectively prevented and an impact phenomenon between the partition wall 144 and the battery cell 110 or the protection circuit module 120 caused by frequent movement may be effectively prevented, thereby reducing damage generated during the use of a product.

Meanwhile, referring back to FIGS. 3 and 6, in the fixing portion 134 of the insulating molding member 130 of FIG. 6, an end portion protruding from the protecting portion 132 in the direction where the partition wall 144 is located may include a hook structure S bent in a downward direction along the partition wall 144. The partition wall 144 and the fixing portion 134 can extend parallel to each other, and the partition wall 144 can be wedged between the fixing portion 134 and the protection portion 132.

In detail, in the end portion of the fixing portion 134, an end portion protruding from the front surface of the protecting portion 132 of the insulating molding member 130 may extend in a downward direction along a front portion of the partition wall 144.

For example, as shown in FIG. 3, the insulating molding member 130 may include three fixing portions 134. Also, an end portion of each of the three fixing portions 134 in an extending direction may extend in the downward direction along the front portion of the partition wall 144, and an overall shape of the fixing portion 134 may be formed like the hook structure S hooked at the front portion of the partition wall 144. Also, portions of the partition wall 144 may be exposed where the three fixing portions 134 are separated from each other.

As such, according to such a configuration of the embodiment of the present disclosure, when viewed from the direction indicated by the arrow F, the fixing portion 134 of the hook structure S may prevent the battery cell 110 from moving in a front-and-back direction, and thus damage to a configuration of the battery cell 110 or a connection structure of the printed circuit board 121 connected to the electrode lead 111 may be prevented.

Figure 7:
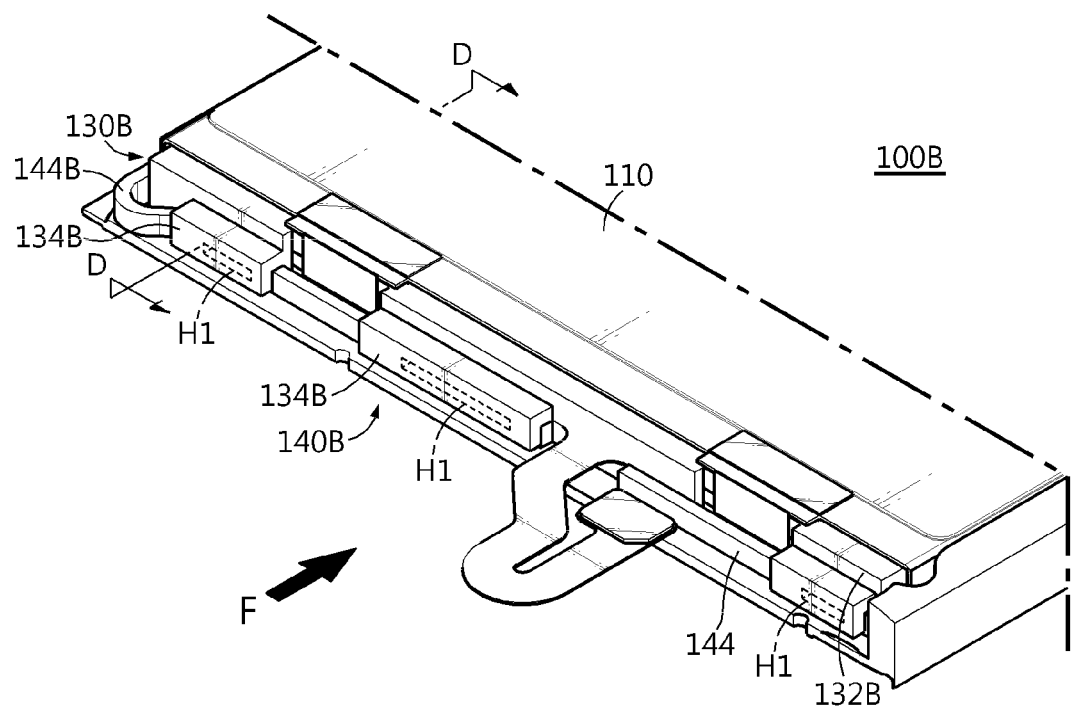
FIG. 7 is a partial perspective view schematically showing a part of a secondary battery pack according to another embodiment of the present disclosure.

FIG. 7 is a partial perspective view schematically showing a part of a secondary battery pack according to another embodiment of the present disclosure. Also, FIG. 8 is a schematic partial cross-sectional view of a pouch-type secondary battery pack taken along a line D-D of FIG. 7.

Figure 8:
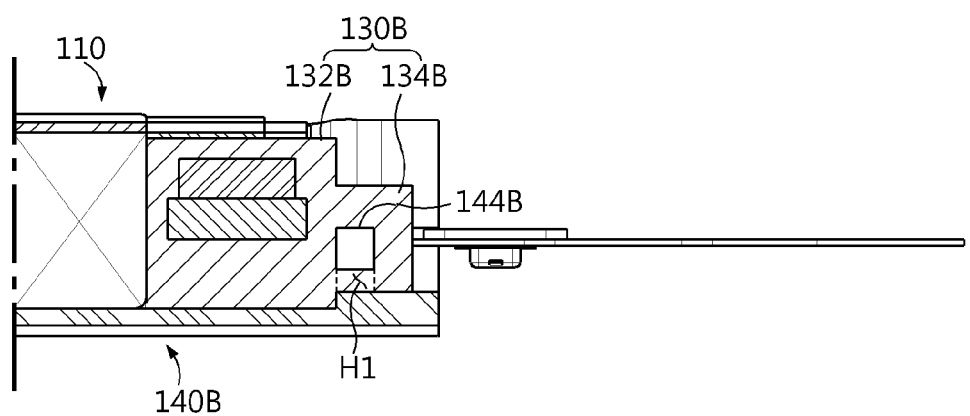
FIG. 8 is a schematic partial cross-sectional view of a pouch-type secondary battery pack taken along a line D-D of FIG. 7.

Referring to FIGS. 7 and 8, a holder 140B of a secondary battery pack 100B according to another embodiment may include at least one insertion hole H1 that penetrates a partition wall 144B of the holder 140B in a horizontal direction. The insertion hole H1 may be elongated along the horizontal direction in which the partition wall 144B is extended.

In addition, a region of a fixing portion 134B of an insulating molding member 130B may be inserted and fixed to the insertion hole H1. The region of the fixing portion 134B inserted to the insertion hole H1 may be connected to the other region bent in a downward direction along the partition wall 144B. In other words, the fixing portion 134B of the insulating molding member 130B may have a ring shape inserted and fixed to the insertion hole H1 provided at the partition wall 144B.

For example, as shown in FIG. 7, three fixing portions 134B of the insulating molding member 130B may be provided. Lengths of the three fixing portions 134B extending in a left-and-right direction may be different from each other. Also, each of the three fixing portions 134B may be formed as a portion protruding from a front surface of a protection portion 132B and extending in a downward direction from the top of the partition wall 144B and a portion penetrated and inserted to the insertion hole H1 of the partition wall 144B contact each other and are solidified.

As such, according to such a configuration of the embodiment of the present disclosure, by providing the portion of the fixing portion 134B of the insulating molding member 130B to be inserted and fixed to the insertion hole H1 provided at the partition wall 144B, a stronger bonding force with the partition wall 144B may be exerted compared to the fixing portion 134 of the hook structure S of the insulating molding member 130B of FIG. 6, and thus durability of the secondary battery pack 100B may be further increased.

Referring back to FIG. 5, the holder 140 of the present disclosure may include a curved portion 146 curved in an arc shape on a plane at one region of the partition wall 144 extending along the circumference of the body portion 142.

In detail, the curved portion 146 of the partition wall 144 may be provided at a location of the body portion 142 where the partition wall 144a provided at the first edge 142a and the partition wall 144c provided at the third edge 142c contact each other. Also, the curved portion 146 of the partition wall 144 may be provided at a location of the body portion 142 where the partition wall 144c provided at the third edge 142c and the partition wall 144b provided at the second edge 142b contact each other. Also, the curved portion 146 of the partition wall 144 may be provided at a location of the body portion 142 where the partition wall 144a provided at the first edge 142a and the partition wall 144d provided at the fourth edge 142d contact each other.

In particular, the curved portion 146 provided at the location of the body portion 142 where the partition wall 144a provided at the first edge 142a and the partition wall 144d provided at the fourth edge 142d contact each other may be curved while further protruding in an outer horizontal direction than remaining regions where the curved portion 146 of the partition wall 144a of the first edge 142a is not provided. In other words, an internal space identical to a protruding shape may be provided inside the curved portion 146 of the partition wall 144.

As such, according to such a configuration of the embodiment of the present disclosure, in the holder 140, by providing the curved portion 146 at the partition wall 144, the partition wall 144 elastically absorbs a pressurizing force in a horizontal direction transferred by movement of the battery cell 110, and thus durability of the holder 140 may be further increased and damage according to a pressurizing force of the battery cell 110 may be reduced.

Figure 9:
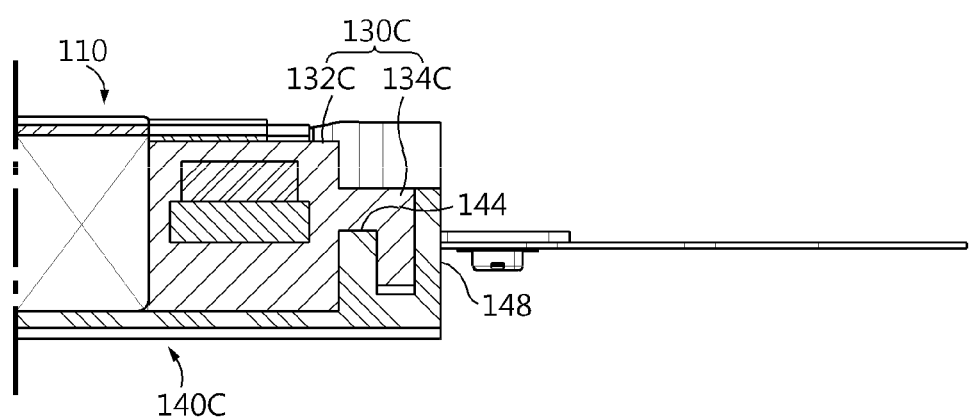
FIG. 9 is a partial cross-sectional view schematically showing a part of a pouch-type secondary battery pack according to another embodiment of the present disclosure.

FIG. 9 is a partial cross-sectional view schematically showing a part of a pouch-type secondary battery pack according to another embodiment of the present disclosure.

Referring to FIG. 9, a holder 140C of a secondary battery pack 100C of FIG. 9 may additionally include a molding barrier wall 148 protruding in an up-and-down direction compared with the holder 140 of FIG. 6. In detail, the molding barrier wall 148 of the holder 140C may be provided at a location spaced apart from the partition wall 144 by a certain distance in an outward direction. In other words, a fixing portion 134C of the insulating molding member 130C may be filled and solidified in a space between the molding barrier wall 148 and the partition wall 144.

For example, as shown in FIG. 9, the fixing portion 134C of the insulating molding member 130C may protrude from a front surface of a protecting portion 132C, and an extending end portion of the fixing portion 134C may be bent in a downward direction along an inner surface of the molding barrier wall 148.

As such, according to such a configuration of the embodiment of the present disclosure, by providing the molding barrier wall 148 to the holder 140C, hot-melt resin injected to form the insulating molding member 130C may be prevented from flowing outside the holder 140C. Accordingly, manufacturing efficiency may be increased and a defect rate may be effectively reduced.

Also, in the present disclosure, the molding barrier wall 148 may function as a guide such that the fixing portion 134C stably extends downward along the partition wall 144, and thus a defect rate of a product may be remarkably reduced.

Meanwhile, referring back to FIG. 6, a lower surface 130c of the insulating molding member 130 may be configured to locate on a same plane as a lower surface 116c of the accommodating portion 116 of the battery cell 110. In other words, the lower surface 130c of the insulating molding member 130 facing the top surface of the body portion 142 of the holder 140 may be located parallel to the lower surface 116c of the accommodating portion 116 of the battery cell 110.

As such, according to such a configuration of the embodiment of the present disclosure, since there is no difference between a height of the accommodating portion 116 of the battery cell 110 in an up-and-down direction and a height of a region where the insulating molding member 130 is located in the up-and-down direction, a structure in which a label sheet attached to a top portion of the battery cell 110 has an inferior outer shape, such as a stepped difference in an up-and-down direction or a wrinkle, is not formed, and thus the label sheet may easily form a smooth flat outer surface. Accordingly, in the present disclosure, an operator may easily handle the secondary battery pack 100 and manufacture the secondary battery pack 100 having excellent outer shape.

Meanwhile, referring back to FIG. 3 together with FIGS. 2 and 4, the protecting portion 132 of the insulating molding member 130 may include a depressed groove H2 recessed in a horizontal inward direction on an outer surface thereof. Also, one region of the electrode lead 111 may be accommodated on an inner surface of the depressed groove H2. In detail, the electrode lead 111 may bend and extend from an end portion of the sealing portion 117 in a downward direction, and then bend again in a direction where the accommodating portion 116 of the battery cell 110 is located. Then, such a bent end portion of the electrode lead 111 may be bonded to the lead connecting plate 123 provided at one surface of the printed circuit board 121 of the protection circuit module 120.

At this time, a center region of the electrode lead 111 in an extending direction may be adhered to an inner surface of the depressed groove H2 provided at the protecting portion 132 of the insulating molding member 130.

For example, as shown in FIGS. 2 and 3, one region of each of the positive electrode lead 111A and the negative electrode lead 111B may be bent to adhere to the inner surface of the depressed groove H2 provided at the protecting portion 132 of the insulating molding member 130.

As such, according to such a configuration of the embodiment of the present disclosure, since a length of the electrode lead 111 connected to the printed circuit board 121 may be reduced by the depressed groove H2 provided at the insulating molding member 130, material costs may be reduced and an internal space of the secondary battery pack 100 may be further utilized or a further compact secondary battery pack 100 may be realized.

Also, a power supply apparatus according to the embodiment of the present disclosure may include the secondary battery pack 100. In detail, the power supply apparatus may be an apparatus storing electric energy, wherein generated power is temporarily stored and supplied to a required place.

In addition, an electronic device according to the embodiment of the present disclosure may include the power supply apparatus. The power supply apparatus may be accommodated inside an external case of the electronic device.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

[List of Reference Numerals]

| | |
|---|---|
| 100: Secondary Battery Pack | 120: Protection Circuit Module |
| 110: Battery Cell | 121: Printed Circuit Board |
| 115: Pouch Exterior Material | 111: Electrode Lead |
| 117: Sealing Portion | 117S: Terrace Structure |
| 116: Accommodating Portion | |
| 130: Insulating Molding Member | 132: Protecting Portion |
| 134: Fixing Portion | H2: Depressed Groove |
| 140: Holder | 142: Body Portion |
| 144: Partition Wall | H1: Insertion Hole |
| 146: Curved Portion | 148: Molding Barrier Wall |
| O1: Heat Radiating Portion | |

INDUSTRIAL APPLICABILITY

The present disclosure relates to a secondary battery pack including a holder. Also, the present disclosure is applicable to industries related to power supply apparatuses and electronic devices including the secondary battery pack.

What is claimed is:

1. A secondary battery pack comprising:
    a battery cell comprising a pouch exterior material that comprises an accommodating portion in which an electrode assembly and an electrolyte solution are accommodated and a sealing portion formed by sealing a circumferential surface of the accommodating portion, and an electrode lead protruding and extending from the sealing portion;
    a protection circuit module comprising a printed circuit board where a protection circuit is formed, wherein the printed circuit board is mounted on a terrace structure of the sealing portion where the electrode lead is formed;
    a holder comprising a body portion having a plate shape such that the battery cell is mounted on one surface thereof, and a partition wall protruding from the body portion in an upward direction to surround at least a portion of a side portion of the battery cell in a horizontal direction; and
    an insulating molding member comprising an electrical insulating material, and comprising a protecting portion coated on and bonded to at least one region of the printed circuit board and a fixing portion protruding from the protecting portion in a direction where the partition wall is located and fixed to one region of the partition wall.

2. The secondary battery pack of claim 1, wherein, in the fixing portion of the insulating molding member, an end portion protruding from the protecting portion in the direction where the partition wall is located has a hook structure bent in a downward direction along the partition wall.

3. The secondary battery pack of claim 1, wherein the partition wall of the holder comprises an insertion hole penetrated in the horizontal direction, and one region of the fixing portion of the insulating molding member is inserted in and fixed to the insertion hole.

4. The secondary battery pack of claim 1, wherein the partition wall extends along a circumference of the body portion, and a curved portion curved in an arc shape on a plane is formed in one region of the partition wall.

5. The secondary battery pack of claim 1, wherein the holder comprises a molding barrier wall spaced apart from the partition wall by a certain distance in an outward direction and protruding and extending in the upward direction.

6. The secondary battery pack of claim 1, wherein the insulating molding member entirely covers the printed circuit board without any externally exposed region of the printed circuit board.

7. The secondary battery pack of claim 1, wherein a lower surface of the insulating molding member is configured to be located on a same plane as a lower surface of the accommodating portion of the battery cell.

8. The secondary battery pack of claim 1, wherein a depressed groove recessed in a horizontal inward direction is provided on an outer surface of the protecting portion of the insulating molding member, and
    wherein the depressed groove is configured to accommodate one region of the electrode lead.

9. The secondary battery pack of claim 1, wherein a heat radiating portion opened in an up-and-down direction and discharging heat generated in the battery cell is provided at the body portion of the holder.

10. A power supply apparatus comprising the secondary battery pack according to claim 1.

11. An electronic device comprising the power supply apparatus according to claim 10.

12. The secondary battery pack of claim 1, wherein the partition wall and the fixing portion extend parallel to each other, and
wherein the partition wall is wedged between the fixing portion and the protection portion.

13. The secondary battery pack of claim 1, wherein the fixing portion is provided in a plurality, and
wherein each of the plurality of fixing portions are separated from each other.

14. The secondary battery pack of claim 13, wherein portions of the partition wall is exposed where the plurality of fixing portions are separated from each other.

* * * * *